Sept. 29, 1970 L. P. FONES 3,530,624
STRUCTURAL ELEMENT FOR AIRCRAFT HANGERS AND THE LIKE
Original Filed March 24, 1966 2 Sheets-Sheet 1
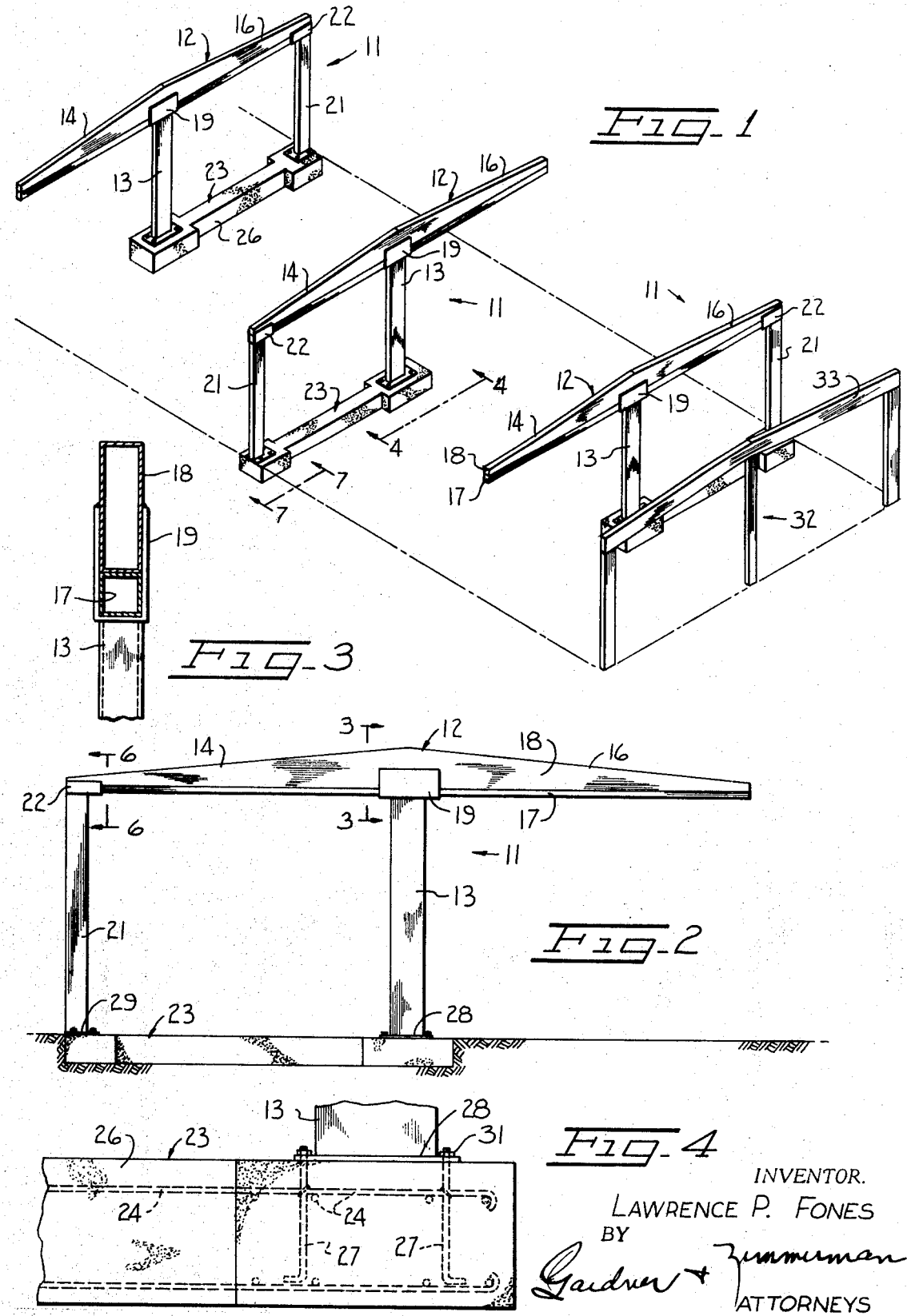
INVENTOR.
LAWRENCE P. FONES
BY
ATTORNEYS Sept. 29, 1970      L. P. FONES      3,530,624

STRUCTURAL ELEMENT FOR AIRCRAFT HANGERS AND THE LIKE

Original Filed March 24, 1966      2 Sheets-Sheet 2

INVENTOR.
LAWRENCE P. FONES
BY
Gardner & Zimmerman
ATTORNEYS

United States Patent Office 3,530,624
Patented Sept. 29, 1970

3,530,624
STRUCTURAL ELEMENT FOR AIRCRAFT HANGERS AND THE LIKE
Lawrence P. Fones, Richmond, Calif., assignor to T-Hangers, Inc., Vacaville, Calif., a corporation of California
Continuation of application Ser. No. 537,050, Mar. 24, 1966. This application Dec. 2, 1968, Ser. No. 786,537
Int. Cl. E04b 1/342
U.S. Cl. 52—93    9 Claims

ABSTRACT OF THE DISCLOSURE

A structural element is described which provides rigid support for a cantilevered beam thereof. The element includes a horizontal metallic beam to which a pair of metallic support columns are secured in right-angular relation at spaced positions. At least one end of the horizontal beam is cantilevered from one of the columns and a tie beam footing structure is secured to the bases of the columns. The footing structure is of reenforced concrete and includes a reenforced tie beam which extends between the column bases to link the same together and thus provide a rigid structure capable of resisting loads applied to the cantilevered portion of the beam.

CROSS-REFERENCE TO RELATED APPLICATION

This application is a continuation of my copending application Ser. No. 537,050 filed Mar. 24, 1966, and now abandoned, for "Structural Elements for Aircraft Hangers and the Like."

DISCLOSURE

This invention relates generally to metallic buildings of aluminum, or the like, such as are often employed as aircraft hangers, for example, and is more particularly directed to a structural element for such buildings which enables large door openings to be provided in the walls thereof without a sacrifice of structural strength.

Metallic buildings of aluminum, galvanized steel, etc., are frequently employed as aircraft hangers, warehouses, or similar structures which require one or more relatively large door openings in their side walls. Typically, the side wall structure has been utilized to provide bearing support for the roof and structural integrity of the overall building. Accordingly, the relatively large unsupported area represented by an expansive door opening has posed severe problems in designing the building for adequate structural strength. The wall structure may be suitably framed about the door opening, however prohibitively massive and costly beams or other structural members are required in the frame structure when the opening is extremely large, or a number of openings representing the major portion of the wall area are required.

It is therefore an object of the present invention to provide metallic buildings employing structural elements of unique design to permit extremely large door openings to be provided in the side walls thereof without requirement of massive, costly framing structure.

Another object of the invention is to provide a structural element in the form of a T with a column secured to the end of one arm and a tie beam extending between the bases of the column and leg of the T, the second arm of the T being cantilevered whereby successive ones of the elements may be oppositely directed to facilitate the provision of unobstructed openings extending the distance between alternate ones of the elements.

Still another object of the invention is the provision of a structural element of the class described arranged to absorb the major portion of the bearing and thrust loads in a building in which they are incorporated.

It is a further object of the invention to provide a structural element of the type generally outlined hereinbefore which may have both ends cantilevered from a central location.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

FIG. 1 is a perspective view of a number of structural elements in accordance with the present invention erected in a staggered pattern to provide the framework of a hanger building, or the like.

FIG. 2 is a side elevational view of one of the structural elements.

FIG. 3 is a sectional view taken at line 3—3 of FIG. 2.

FIG. 4 is a sectional view taken at line 4—4 of FIG. 1.

Figure 6:
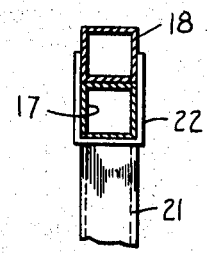
FIG. 6 is a sectional view taken at line 6—6 of FIG. 2.

Referring to the drawings, FIGS. 1 and 2 in particular, there will be seen to be provided a structural element 11, in accordance with the present invention, which is of substantially T-shaped configuration with at least one arm cantilevered. More particularly, in the preferred form of the element 11, same includes a metallic beam 12 of substantially rafter shaped configuration with a metallic column 13 secured centrally thereto in right-angularly projecting relationship. The arm portions 14, 16 of the beam oppositely right-angularly projecting from the column, in combination with the column, define a T. The lower surfaces of the arms of the beam are horizontal, while the upper surfaces thereof are upwardly inclined from their ends to the center of the beam. In order to provide added strength with a minimum of material, the beam is preferably formed of two secured together tubular parts, namely a lower part 17 of uniform rectangular tubular cross-section, and an upper part 18 of rectangular tubular cross-section increasing in elevation from its opposite ends towards its center (see FIGS. 3 and 6). To secure the beams to the column 13, a channel shaped saddle 19 is best secured to the upper end of the column to receive the beam between the parallel spaced-apart legs of the saddle. The beam is secured to the saddle as by welding, or other mechanical means.

Figure 7:
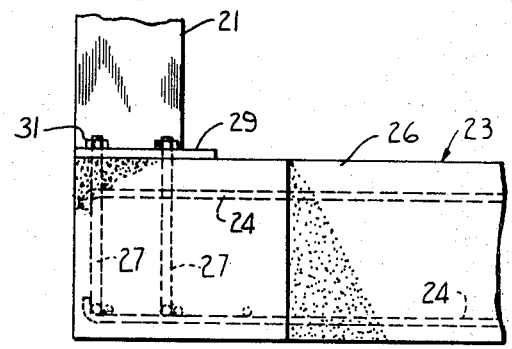
FIG. 7 is a sectional view taken at line 7—7 of FIG. 1.

A metallic column 21 is also secured to one end of the beam, for example the end of arm portion 14, in parallel spaced relation to the central column 13. As in the case of the column 13, a channel shaped saddle 22 is preferably employed in the securance of the column 21 to the beam. The bases of the columns 13, 21 are interconnected by a tie beam footing 23 of preferably reenforced concrete. To this end, the footing includes reenforcing rods 24 embedded in a concrete slab 25, with anchor bolts 27 embedded in the slab and tied to the rods, as shown in FIGS. 4 and 7. Threaded ends of the bolts project upwardly from the slab adjacent its opposite ends to extend through apertures in flange plates 28, 29 secured to the bases of the columns 13, 21. Nuts 31 are in turn threaded upon the bolts to secure the columns to the footing.

Figure 5:
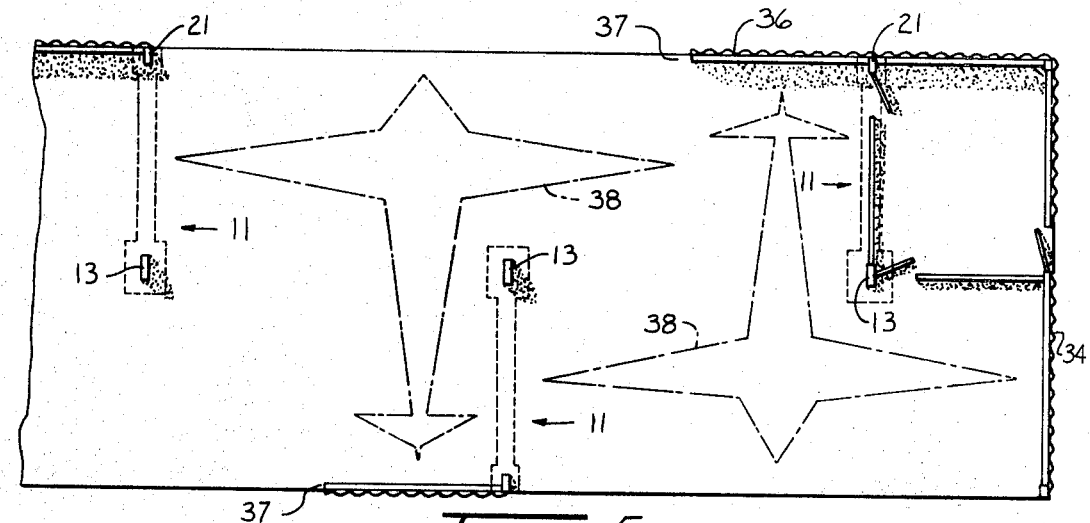
FIG. 5 is a plan sectional view of a building which may be readily evolved from the framework of FIG. 1.

It will be thus appreciated that the structural element 11 just described has one arm 16 cantilevered from the central column 13. In the construction of a hanger, a plurality of the elements are erected with the cantilevered arms of adjacent elements facing in opposite directions and the central columns 13 in longitudinal alignment, as shown in FIGS. 1 and 5. The number of elements employed is dependent on the number of partitioned rooms or hanger units that are desired. Conventional end frames 32 are erected at the opposite ends of the hanger in longitudinally spaced relation to adjacent ends of the elements 11. Roofing structure (not shown) may then be secured atop the beams 12 of the elements 11 and beams 33 of the end frames. End walls 34 may be secured to the end frames 32 and side walls 36 may be secured to the columns 21 of the elements 11 where appropriate to close in the hanger. It is of importance to note that the resulting hanger has expansive door openings 37 in staggered relation on opposite sides thereof. Such openings may extend the distance between alternate ones of the elements 11, the cantilevered arm of an intermediate one of the elements being at the opening. Oppositely facing hanger units are provided inwardly of the door openings, which units each have a relatively elongated forward area adjacent the opening and a smaller rearward area between adjacent elements. The forward area of each unit is capable of accommodating the wings of an aircraft 38 while the fuselage and tail are accommodated by the rearward area.

Figure 8:
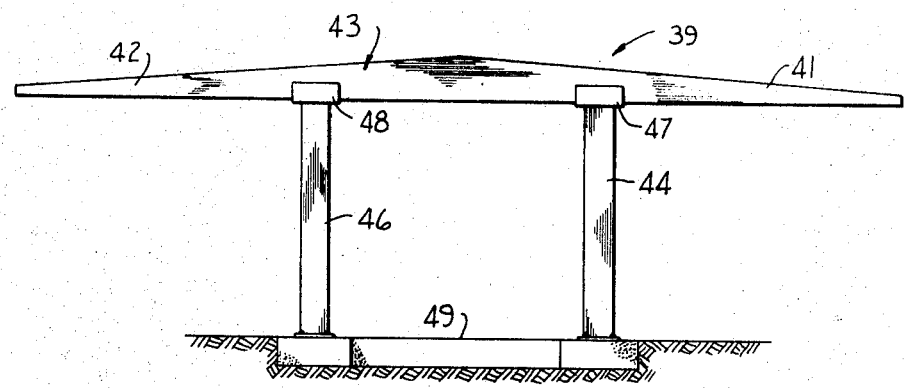
FIG. 8 is a side elevational view of a modified form of structural element in accordance with the present invention.

In some instances it is desirable that the hanger, or other building, be provided with opposed large door openings. It may be then desirable to employ a modified form of building element 39 having two oppositely directed cantilevered arms 41, 42, as shown in FIG. 8. More particularly, the arms are the opposite ends of a rafter shaped beam 43 similar to the beam. A pair of columns 44, 46 are respectively secured to the beam 43 at positions intermediate the opposite ends and center thereof. Saddles 47, 48 are preferably employed in the securance of the columns to the beam. The bases of the columns are secured to a tie beam footing 49 in a manner analogous to that of columns 13, 21 to footing 23 of element 11. The arms 41, 42 are thus cantilevered from the columns 44, 46.

I claim:

1. A structural element comprising a beam, a pair of metallic support columns secured in right-angular relation to said beam at spaced positions thereof with at least one end of said beam cantilevered from one of said columns, and a footing structure secured to the bases of said columns, said footing structure being of reenforced concrete and including a reenforced concrete tie beam having reenforcing rods embedded therein extending between said column bases to link the same together, and anchoring means directly securing said reenforcing rods to the bases of said columns to thereby provide a rigid structure for resisting bending loads on said tie beam and loads applied to said cantilevered portion of said beam.

2. A structural element according to claim 1 wherein said anchoring means directly securing said reenforcing rods to the bases of said columns provides a metallic connection between said columns and said reenforcing rods to transmit any bending movement at the base of either of said columns to said reenforcing rods.

3. A structural element according to claim 1, further defined by said beam being of rafter shaped configuration including a lower horizontal surface and upper surfaces upwardly inclined from the opposite ends of the beam to the center thereof.

4. A structural element according to claim 3, further defined by said beam having a lower tubular portion of uniform rectangular cross-section and an upper tubular secured to the lower portion and having a rectangular cross-section progressively increasing in elevation from the opposite ends to the center of the beam.

5. A structural element according to claim 4, further defined by a pair of channel shaped saddles secured to the upper ends of said columns, said saddles receiving said beam between the spaced parallel side legs thereof and respectively secured to said beam at the center and one end thereof.

6. A structural element according to claim 5, further defined by said anchoring means comprising anchor bolts in said footing structure and secured to said reenforcing rods embedded within said tie beam, said bolts projecting upwardly from said footing, flange plates secured to the bases of said columns and having apertures traversed by said bolts, and nuts threadably secured to said bolts.

7. A structural element according to claim 1, further defined by a pair of saddles respectively securing the upper ends of said columns to said beam.

8. A structural element according to claim 1, further defined by said anchoring means comprising anchor bolts embedded in said footing structure and secured to said reenforcing rods embedded within said tie beam, said bolts projecting upwardly from said footing, flange plates secured to the bases of said columns and having apertures traversed by said bolts, and nuts threadably secured to said bolts.

9. A structural element according to claim 1, wherein one of said columns is secured to the center of said beam and the other of said columns is secured to one end of said beam.

References Cited

UNITED STATES PATENTS

| 579,007 | 3/1897 | Phelps | 52—721 |
|---|---|---|---|
| 1,594,080 | 7/1926 | Thies | 52—73 X |
| 1,780,102 | 10/1930 | Watt | 52—234 X |
| 2,728,587 | 12/1955 | McKinley | 52—731 X |
| 2,903,752 | 9/1959 | Volk | 52—73 |
| 3,242,620 | 3/1966 | Kaiser | 52—73 |
| 3,324,611 | 6/1967 | Gamber | 52—296 X |

FOREIGN PATENTS

| 77,774 | 8/1919 | Austria. |
|---|---|---|

PRICE C. FAW, JR., Primary Examiner

U.S. Cl. X.R.

52—73, 296, 300, 721